(12) United States Patent
Zhang (10) Patent No.: US 8,582,676 B1
(45) Date of Patent: Nov. 12, 2013

(54) LOW COMPLEXITY GENERAL SAMPLING RECOVERY METHOD AND APPARATUS

(75) Inventor: Yun Zhang, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/595,775

(22) Filed: Aug. 27, 2012

(51) Int. Cl.
*H04K 1/10* (2006.01)
*H04L 27/28* (2006.01)

(52) U.S. Cl.
USPC ........... 375/260; 375/316; 375/326; 375/327; 375/350

(58) Field of Classification Search
USPC ............................ 375/26, 316, 326, 327, 350
See application file for complete search history.

(56) References Cited

U.S. PATENT DOCUMENTS

| 6,044,107 | A | * | 3/2000 | Gatherer et al. | 375/222 |
| 6,904,098 | B1 | * | 6/2005 | Isaksen et al. | 375/261 |
| 2004/0213337 | A1 | * | 10/2004 | Li et al. | 375/222 |
| 2008/0320528 | A1 | * | 12/2008 | Kim et al. | 725/62 |

* cited by examiner

*Primary Examiner* — Ted Wang
(74) *Attorney, Agent, or Firm* — Blakely Sokoloff Taylor & Zafman (57) ABSTRACT

Method and apparatus for achieving high precision sampling recovery at a relatively low sampling rate. The apparatus includes: a sampling rate conversion module for converting the sampling rate of a received signal to an required sampling rate; a time domain impulse response estimation module for estimating a time domain impulse response of a transmission channel according to data output by the sampling rate conversion module; a high order interpolation module for performing high order interpolation to one or more selected transmission paths after obtaining the time domain impulse response; and a sampling error information extraction module for extracting sampling phase offset information and sampling frequency offset information based on interpolation results and drifts in two consecutive interpolation results of the high order interpolation step. The apparatus is capable of realizing fast high precision locking of sampling phase and correction of sampling frequency offset at a relatively low sampling rate.

14 Claims, 6 Drawing Sheets

| Frame head (420 symbols) (55.6μs) | Frame Body (containing system information and data) (3780 symbols) (500μs) |

(a) Signal Frame Pattern 1

| Frame head (595 symbols) (78.7μs) | Frame Body (containing system information and data) (3780 symbols) (500μs) |

(b) Signal Frame Pattern 2

| Frame head (945 symbols) (125μs) | Frame Body (containing system information and data) (3780 symbols) (500μs) |

(c) Signal Frame Pattern 3

FIG.6

| 82-Symbol Preamble Sequence | PN255 | 83-Symbol Postamble Sequence |

(a) Structure of PN420

| PN595 |

(b) Structure of PN595

| 217-Symbol Preamble Sequence | PN511 | 217-Symbol Postamble Sequence |

(c) Structure of PN945

LOW COMPLEXITY GENERAL SAMPLING RECOVERY METHOD AND APPARATUS

CROSS-REFERENCE TO RELATED APPLICATIONS

This application claims the priority of Chinese patent application number 201110253485.1, filed on Aug. 30, 2011, the entire contents of which are incorporated herein by reference.

TECHNICAL FIELD

The present invention relates to a sampling recovery method and apparatus, and more particularly, to a method and apparatus for achieving high precision sampling recovery at a relatively low sampling rate, which are applicable in all OFDM transmission systems, spread spectrum transmission systems and their corresponding MIMO systems. The present invention is worth employing in DTMB, ATSC, CMMB, DVBT, ISDBT, WIFI, WIMAX, CDMA, 4G and other communication systems.

BACKGROUND

Sampling clock offset, including sampling phase offset and sampling frequency offset, commonly exists in both wired and wireless communication systems. Sampling phase offset refers to the offset that the actual sampling instant deviates from the optimal sampling instant, while sampling frequency offset refers to the sampling drift that caused by the inconsistency between the crystal oscillator frequency at the sending end and the crystal oscillator frequency at the receiving end in a communication system. In a digital system, sampling frequency offset represents as an increase or decrease of the number of sampling points within the same time span in the time domain, and such increase or decrease of sampling points will accumulate over time. Sampling phase recovery and sampling frequency recovery are collectively referred to as sampling recovery.

For an OFDM receiver, if there only exists sampling phase offset, it will only result in a phase rotation of each sub-carrier signal, which will not have a significant impact on the signal-to-noise ratio at the receiving end of the system after carrying out a channel compensation. In contrast, if there exists sampling frequency offset, on one hand, it will result in the start time drift of the FFT (Fast Fourier Transform) window; and on the other hand, will destroy the orthogonality between subcarriers, resulting in inter-carrier interference and causing the reduction of the signal-to-noise ratio of the system. For a spread spectrum communication system, either sampling phase offset or sampling frequency offset will result in an inaccurate optimal matching time and therefore affect the correlation peak after the matching. More seriously, sampling frequency offset will lead to continuous drifting of the optimal sampling instant, as a result, the signal cannot be demodulated normally.

Early-late gate is the most fundamental and the most important algorithm principle in sampling recovery. Early-late gate algorithm extracts sampling phase offset information by detecting an optimal instant sampling point as well as the sampling points before and after it, and adjusts the sampling frequency offset by continuously tracking changes in the sampling phase offset. The early-late gate is generally employed at a high rate to extract sampling phase offset information in a spread spectrum communication system. This requires the system to operate at a high rate, and therefore increases the implementation complexity of the system.

Generally, an OFDM system obtains sampling phase offset information through conjugate multiplication of the pilots located at the same subcarrier position of two consecutive OFDM symbols. As this algorithm is based on the assumption that the channel responses of the two consecutive OFDM symbols remain substantially unchanged, it fails to have good performance in a mobile environment. Moreover, in order to maintain a satisfying transmission efficiency, the number of pilots is typically very limited, which will largely restrain the performance of the algorithm. 'Timing Recovery for OFDM Transmission' published in IEEE in 2000 proposed a sampling recovery method using locally generated lead and lag pilots. This method essentially belongs to the principle of early-late gate algorithm. However, the method has two shortcomings as follows: 1) as it performs estimation by using pilot subcarriers, its performance is affected by the number of pilots; 2) it needs a reference path for a phaselocked loop to lock the sampling phase and the sampling frequency eventually, but as any path may undergo fading and even elimination in the mobile environment, locking failure will occur in the algorithm during mobile reception.

CN102075475A and CN101534184A disclose sampling recovery methods for CMMB and DTMB systems, respectively. The methods are based on a fundamental concept to continuously correct sampling frequency offset by tracking the drift of the strongest path at a symbol rate. These methods have two defects as follows: 1) the algorithm itself is designed only for sampling frequency offset correction, not for sampling phase offset correction; 2) it can be affected by mobile environment and multipath distribution since the adjustment interval is very long, and therefore, it may be impossible to extract timing information in a mobile environment having a continuously changing multipath or a multipath with very complicated distribution.

CN1677910A discloses a sampling recovery method for DTMB system, and CN101645861A discloses a method for extracting sampling offset. Both of the methods extract sampling offset information from the strongest path in a transmission channel, and then carry out sampling recovery by using a phaselocked loop. Although these methods have better performance in multipath channels and mobile channels, they still have problems as follows: 1) due to the delay effect in the operation of a phaselocked loop, it always take some time for the phaselocked loop to reach a stable state, which is disadvantageous for burst communication; 2) when the multipath changes dramatically, the algorithm needs to track back and forth to lock a different path, which will cause the phaselocked loop to keep switching between the capture mode and the track mode, and is significantly disadvantage for the stability of the algorithm; and 3) in order to ensure the precision of sampling recovery, the system is required to operate at a high sampling rate which is much higher than the rate needed for data demodulating operation, thus increasing the implementation complexity of the system and wasting the hardware resources and processing time.

SUMMARY OF THE INVENTION

An objective of the present invention is to provide a method and apparatus for achieving high precision sampling recovery at a relatively low sampling rate. The method and apparatus have a wide range of applications, and is capable of quickly realizing high precision sampling phase locking and sampling frequency offset correction with less hardware resource operating at a relatively low sampling rate.

To achieve the above objective, the present invention provides an apparatus for achieving high precision sampling recovery at a relatively low sampling rate, which includes:

a sampling rate conversion module for converting a sampling rate of a received signal to a required sampling rate;

a time domain impulse response estimation module for estimating a time domain impulse response of a transmission channel based on data output by the sampling rate conversion module;

a high order interpolation module for performing high order interpolation for one or more selected transmission paths after obtaining the time domain impulse response;

a sampling error information extraction module for extracting sampling phase offset information and sampling frequency offset information based on interpolation results and drifts in two consecutive interpolation results of the high order interpolation module, wherein the sampling rate conversion module converts the sampling rate of the received signal to the required sampling rate by performing compensation to sampling phases and sampling frequencies based on the extracted sampling phase offset information and sampling frequency offset information.

Preferably, the apparatus for achieving high precision sampling recovery at a relatively low sampling rate further includes a digitally controlled oscillator for compensating sampling phases and sampling frequencies so as to obtain the required sampling rate.

Further, the time domain impulse response estimation module includes:

a CP removing module;

an FFT module for performing FFT operation on an OFDM symbol to obtain a frequency domain OFDM symbol;

a frequency domain channel estimation module for estimating a frequency domain response of the channel by using frequency domain discrete pilots;

an IFFT module for converting the frequency domain channel response to a time domain channel response by an IFFT conversion so as to obtain the time domain impulse response of the channel.

Preferably, the apparatus for achieving high precision sampling recovery at a relatively low sampling rate further includes a smoothing filter for performing smoothing filtering on the sampling frequency offset information to reduce influence of noises.

Further, the time domain impulse response estimation module includes a correlator for correlating a received sequence with a local PN sequence.

The present invention also provides a method for achieving high precision sampling recovery at a relatively low sampling rate, including:

a sampling rate conversion step for converting a sampling rate of a received signal to a required sampling rate;

a time domain impulse response estimation step for estimating a time domain impulse response of a transmission channel based on data output by the sampling rate conversion step;

a high order interpolation step for performing high order interpolation to one or more selected transmission paths after obtaining the time domain impulse response;

a sampling error information extraction step for extracting sampling phase offset information and sampling frequency offset information based on interpolation results and drifts in two consecutive interpolation results of the high order interpolation step;

a compensation step for performing compensation to sampling phases and sampling frequencies based on the extracted sampling phase offset information and sampling frequency offset information so as to convert the sampling rate of the received signal to the required sampling rate.

Further, the time domain impulse response estimation step includes:

a CP removing step;

an FFT step for performing FFT operation on an OFDM symbol to obtain a frequency domain OFDM symbol;

a frequency domain channel estimation step for estimating a frequency domain response of the channel by using frequency domain discrete pilots;

an IFFT step for converting the frequency domain channel response to a time domain channel response by an IFFT conversion so as to obtain the time domain impulse response of the channel.

Further, in the high order interpolation step, the transmission paths are selected by simultaneously tracking a plurality of strong multipath components.

Further, the sampling phase offset information is extracted using the formula MaxPos−IntPos=FracPos(−1≤FracPos<1), where, IntPos is the position of a strong path before the interpolation is performed, indicating a current sampling instant at a low resolution; MaxPos is the position of the strong path after the interpolation is performed, indicating an optimal sampling instant obtained through improving the resolution by the high order interpolation; FracPos is the difference between MaxPos and IntPos, indicating the sampling phase error of a current frame.

Further, the sampling frequency offset information is calculated using the formula $R_s*(MaxPos_2-MaxPos_1)/FrmLen$ (Hz), where, $MaxPos_1$ and $MaxPos_2$ are optimal sampling instants of the same strong path derived by two consecutive high order interpolations, the two consecutive interpolations being spaced in time by a plurality of signal frames; a difference between $MaxPos_2$ and $MaxPos_1$ is the number of offset sampling points resulted from the sampling frequency offset; $R_s$ is the baseband rate; FrmLen is the number of sampling points of the plurality of signal frames between the two consecutive interpolations when there is no sampling offset.

Further, in the high order interpolation step, the high order interpolation is only performed to selected transmission paths and several points around each of the selected transmission paths, the transmission paths being one or more strong paths in a transmission environment.

Further, after calculation of the sampling frequency offset information, the calculated results are passed through a smoothing filter so as to reduce influence of noises.

Further, a new signal output is obtained based on a new sampling rate using the formula $y(kT_i)=y[(m_k+u_k)T_s]=\sum_{i=I_1}^{I_2}\times[(m_k-i)T_s]h_I[(i+u_k)T_s]$, where $m_k$ is a reference point of an interpolation filter; $u_k$ is a distance between an actual interpolation point and the reference point; $I_2-I_1+1$ is a number of sample points required by each interpolation.

Further, for pseudo random sequence spread spectrum system, a pseudo random sequence can be used to correlate with received sequence in the time domain during the time domain impulse response estimation step.

By using the above technical solution, the present invention is capable of operating at a relatively low processing rate. The rate may be a symbol rate, or may be a fraction ratio or an integer multiple of the symbol rate. Generally, in order to maintain a low complexity of the system, the processing rate is preferably no more than two times of the symbol rate; then high precision sampling recovery can be achieved by performing high order interpolation to one or more selected stronger paths.

On this basis, the method for sampling recovery of the present invention can achieve better performance in mobile fading. As only one strong path is focused on in conventional sampling recovery methods, the precision of sampling recovery is directly depended on duration of the strong path. The longer the duration is, the higher the precision will be, and therefore, once the strong path undergoes fading, a new strong path should be selected for retracking. The present invention may simultaneously focus on a plurality of strong multipath components and perform sampling recovery based on the strong path with the longest duration, such that fading or elimination of a certain multipath component will not affect the continuity of the sampling recovery process, and high precision sampling recovery can also be achieved. The principle of the present invention can be widely applied in OFDM systems, spread spectrum transmission systems and their corresponding MIMO systems.

BRIEF DESCRIPTION OF THE DRAWINGS

FIG. 3($a$) is the optimal sampling instants (of the previous frame) obtained before and after high order interpolation is performed in a DVB-T system.

FIG. 3($b$) illustrates the optimal sampling instants (of the following frame) obtained before and after the high order interpolation is performed in the DVB-T system.

DETAILED DESCRIPTION

Embodiment 1

Figure 1:
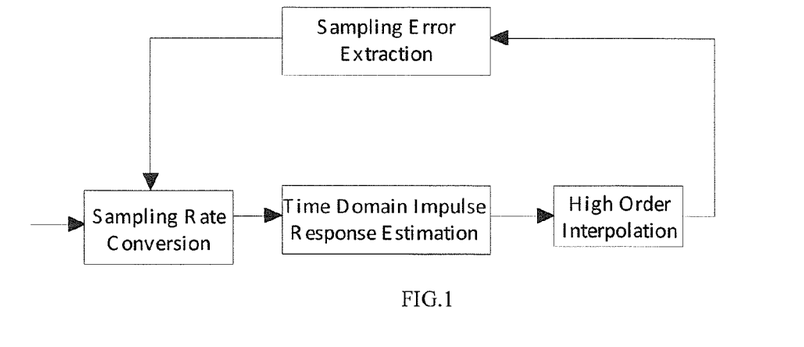
FIG. 1 is a schematic diagram illustrating the structure of a general sampling recovery apparatus of the present invention.

Referring to FIG. 1, the present invention provides a general sampling recovery apparatus, which includes: a sampling rate conversion module for converting a sampling rate of a received signal to a required sampling rate;

a time domain impulse response estimation module for estimating a time domain impulse response of a transmission channel based on data output by the sampling rate conversion module;

a high order interpolation module for performing high order interpolation to one or more selected transmission paths after obtaining the time domain impulse response;

a sampling error information extraction module for extracting sampling phase offset information and sampling frequency offset information based on interpolation results and drifts in two consecutive interpolation results of the high order interpolation module, wherein the sampling rate conversion module converts the sampling rate of the received signal to the required sampling rate by performing compensation to sampling phases and sampling frequencies based on the extracted sampling phase offset information and sampling frequency offset information.

Based on the sampling recovery apparatus, the present invention also provides a method for sampling recovery, which includes the following steps:

a sampling rate conversion step for converting a sampling rate of a received signal to a required sampling rate;

As is known, for a frequency-limited signal x(t), as long as the sampling theorem is satisfied, the original analog signal x(t) can be recovered from the sampling values $x(mT_s)$ without loss by using an ideal low-pass filter, as shown in the following equations, $$x(t) = \sum_{-\infty}^{+\infty} x(mT_s) h_I(t - mT_s),$$

$$h_I(t) = \frac{\sin(\pi t / T_s)}{\pi t / T_s}$$

where, $h_I(t)$ is impulse response of the ideal low-pass filter; $T_s$ is sampling interval; the filter is an acausal IIR filter, which can be approximated by a finite order FIR filter in implementation. In fact, for most cases, what we need indeed is to convert one sample rate to another sample rate, namely pass signal $x(mT_s)$ with sampling interval $T_s$ through filter $h_I(t)$ to form analog signal x(t), and then re-sample it with another sampling interval $T_i$. The output of the re-sampling can be expressed as $y(kT_i) = \Sigma_m x(mT_s) h_I(kT_i - mT_s)$. Taking the actual clock $T_s$ as an interpolation point, we can get $kT_i = (kT_i/T_s)T_s = (m_k + u_k)T_s$, where $kT_i$ indicates the k-th sampling point under the new sampling interval $T_i$; $m_k$ and $u_k$ respectively indicate an integral portion and a decimal portion of $kT_i/T_s$. In fact, $m_k$ can be regarded as a reference point of the interpolation filter, and $u_k$ is the distance between the actual interpolation point and the reference point. Then we have $$y(kT_i) = y[(m_k + u_k)T_s] = \Sigma_{i=I_1}^{I_2} \times [(m_k - i)T_s] h_I[(i + u_k)T_s]$$

where, $I_2 - I_1 + 1$ is the number of sampling points required by each interpolation calculation. In practice, $m_k$ and $u_k$ of each interpolation point can be calculated using a digitally controlled oscillator. The above shows the basic principle of the sampling rate conversion module.

A time domain impulse response estimation step for estimating a time domain impulse response of a transmission channel based on the data output by the sampling rate conversion step;

The time domain impulse response of a transmission channel may either be an accurately estimated time domain impulse response, or a rough result derived by pseudo-random sequence matching. The implementation of this module is associated with the type of the transmission system. For a pseudo random sequence spread spectrum system, a pseudo random sequence may be used to directly correlate with the received sequence in the time domain, such that a peak value $h(n) = \Sigma_{i=0}^{M-1} r(n+i) \overline{PN}(i)$ will be achieved within the transmission path, where r(n) is the time domain signal received; $\overline{PN}$ is the conjugate sequence of a local pseudo random sequence; M is the length of the pseudo random sequence.

For a CP-OFDM system, as there is no pseudo-random sequence in the time domain, the time domain impulse response cannot be obtained as in the pseudo random sequence spread spectrum system, i.e., by directly correlating in the time domain. As the CP-OFDM system needs a frequency domain channel response for signal demodulation, the time domain impulse response can be obtained by converting the frequency domain channel response to a time domain one via IFFT (inverse FFT) operation.

A high order interpolation step for performing high order interpolation to one or more selected transmission paths after obtaining the time domain impulse response;

Although the precision of sampling recovery is directly related to the sampling rate, and the higher the rate is, the higher the precision will be, the receiver operating at a high rate will result in great waste of hardware costs and processing time. Considering the fact that sampling offset information is usually extracted based on a certain transmission path and sampling points around the path, it is practical to extract timing error information by performing high order interpolation only to this certain transmission path and the sampling points around it. Therefore, high order interpolation is only performed to a selected transmission path and several points around the path, while the receiver can operate at a low rate, in this way high precision can be ensured and the complexity of the receiver can be reduced. It shall be mentioned that, the selected transmission path should be for common cases, but not must be, the strongest path. The selected transmission path may be any path in the transmission channel that is relatively strong. A plurality of interpolation methods may be used herein, for example, an interpolation based on a low-pass filter, or an n-th order polynomial interpolation, or the combination thereof.

A sampling error information extraction step for extracting sampling phase offset information and sampling frequency offset information based on interpolation results and drifts in two consecutive interpolation results of the high order interpolation step.

The present invention obtains sampling phase offset and sampling frequency offset based on peak positions and their drifts derived by performing two consecutive interpolations to the same path, wherein the two consecutive interpolations are spaced by a certain interval. This method is applicable in both burst and non-burst transmission modes. The extraction of sampling offset information is calculated once per signal frame or once per several signal frames; sampling points before the high order interpolation (low rate) correspond to integral sampling points, while sampling points after the high order interpolation correspond to fractional sampling points. For convenience of description, a position of a strong path before the high order interpolation is expressed as IntPos, indicating a current sampling instant at a low resolution; a position of the strong path after the high order interpolation is expressed as MaxPos, indicating an optimal sampling instant obtained by improving the resolution through the high order interpolation. Their difference is used to express the sampling phase error of a current frame:

MaxPos−IntPos=FracPos(−1<FracPos<1).

The extraction of sampling frequency error can be achieved by comparing two optimal sampling instants spacing a certain duration. As discussed above, after each high order interpolation, we will have a position MaxPos of the strong path indicating an optimal sampling instant. When there is no sampling frequency offset, the interval between positions $MaxPos_1$ and $MaxPos_2$ of the same strong path corresponding to two consecutive high order interpolations should be equivalent to the number of sampling points of the signal frames between these two interpolations and can be expressed as FrmLen. When there exists a sampling frequency offset, the interval will be greater or smaller than FrmLen. In other words, in an ideal case that no sampling frequency offset exists, optimal sampling instants obtained by spacing a plurality of frames will not change, while in the case that there is a sampling frequency offset, the optimal sampling instants will change. Let $MaxPos_1$ and $MaxPos_2$ be optimal sampling instants of the same strong path derived by two consecutive high order interpolations spaced in time by a plurality of signal frames, a difference between them, $MaxPos_2-MaxPos_1$, indicates a number of offset sampling points resulted from the sampling frequency offset. The sampling frequency offset can be calculated based on the difference using the calculation formula: $R_s*(MaxPos_2-MaxPos_1)/$FrmLen (Hz), where $R_s$ is baseband rate.

The sampling rate conversion step obtains the required sampling rate by compensating sampling phases and sampling frequencies based on the extracted sampling phase offset information and sampling frequency offset information. In this embodiment, the compensations are realized by adjusting the digitally controlled oscillator in the sampling rate conversion module.

In fact, the method of the present invention can also be effectively applied in a mobile reception environment. Generally, during mobile reception of signals, multiple transmission paths are included in a transmission channel, and the strength of each transmission path keeps changing. The present invention obtains sampling phase offset and sampling frequency offset based on peak positions and their drifts derived by performing two high order interpolations spaced by a certain interval to the same path, and the longer the interval is, the higher the estimation accuracy will be. Therefore, in theory, infinitely high estimation accuracy can be reached by continuously tracking a selected strong path in a static transmission environment in which the transmission channels remain unchanged. In the case of a mobile reception environment, each path will undergo fading. When one path gets very weak, it cannot be tracked any more. However, paths will not get so weak at the same time as the randomness of multipath fading exists. Therefore, the present invention proposes to track a plurality of strong multipath components simultaneously and perform sampling recovery to the strong path which has the longest duration, such that high precision sampling recovery can be realized even when the receiver is situated in a multipath transmission environment with dramatically changing transmission channels.

Embodiment 2

In this embodiment, the present invention provides an apparatus and method for sampling recovery employed in a CP-OFDM system. The European digital terrestrial television broadcasting standard DVB-T is a typical CP-OFDM system, which employs the OFDM technology for resisting complicated frequency selective fading in ground environments and a concatenated coding in combination with interleaving technology for ensuring reliable data transmission. The DVB-T standard supports 8K and 2K transmission modes. The present embodiment is described by taking the 8K mode as an example. The technical specifications supported by 8K mode system can be classified into three types: 1) a 64QAM characterized high-bit-rate fixed reception mode with an effective net bit rate of up to 20-27 Mbps; 2) a 16QAM characterized medium-bit-rate portable reception mode with an effective net bit rate of about 14-18 Mbps; 3) a 4QAM characterized low-bit-rate mobile reception mode with an effective net bit rate of lower than 6 Mbps. The main application of the DVB-T standard is the high-bit-rate fixed reception mode. As 64QAM constellation points are close to each other, it is very sensitive to sampling frequency offset.

In the DVB-T 8K mode, an 8192 points FFT is employed, in which 6817 valid subcarriers are distributed on two sides of the DC subcarrier; the DC subcarrier and the high frequency virtual subcarriers at both ends are not used for signal transmission. Virtual subcarriers not only ensure that the number of points of FFT and IFFT is in integer power of two, but also reduce the implementation complexity of an anti-alias filter. A length of a cyclic prefix is arranged to be one sixteenth of the FFT length, i.e. 512 sampling points in all. Therefore, a complete OFDM symbol has 8704 sample points in the time domain. As channel estimation and equalization in the DVB-T system are operated directly at a baseband rate, the sampling rate conversion module outputs data at the baseband rate. After the complete OFDM symbol is collected (totally containing 8129 points), an FFT operation is performed to obtain an OFDM symbol in frequency domain. A frequency domain discrete pilot is employed to estimate a frequency domain response of the channel for each OFDM symbol in the DVB-T system. As the time domain channel impulse response has a Fourier transform relationship with a frequency domain response, the time domain channel impulse response can be obtained by converting a frequency domain response of the channel obtained from the frequency domain channel estimation module to a time domain response of the channel by an IFFT conversion.

Figure 2:
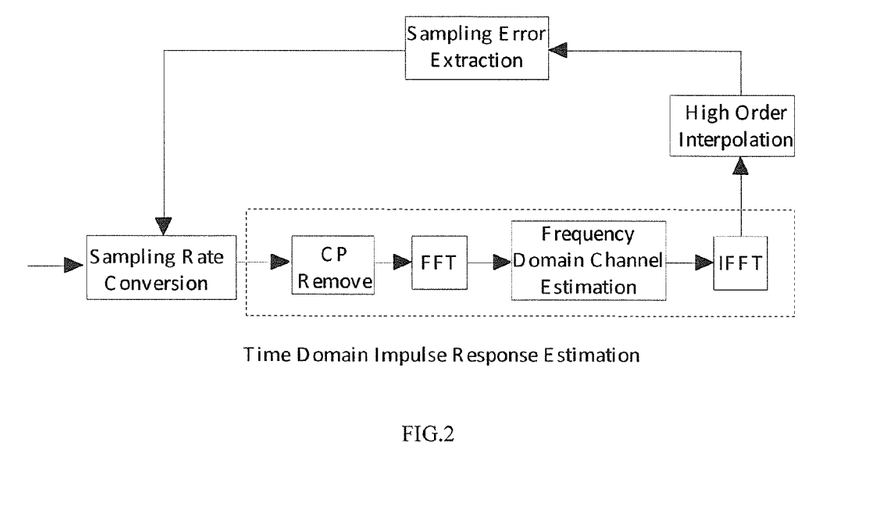
FIG. 2 is a schematic diagram illustrating the structure of a sampling recovery apparatus for a CP-OFDM system.

FIG. 2 illustrates a structure of the CP-OFDM system employing the present invention. The dashed box indicates a time domain channel impulse response estimation module, which includes:

a CP removing module;

an FFT module for performing FFT operation on an OFDM symbol to obtain an frequency domain OFDM symbol;

a frequency domain channel estimation module for estimating a frequency domain response of the channel by using frequency domain discrete pilots; and an IFFT module for converting the frequency domain channel response to a time domain channel response by an IFFT conversion so as to obtain the time domain impulse response of the channel.

Moreover, this embodiment also provides a method for obtaining time domain channel impulse response employed in the CP-OFDM system, which includes:

an FFT step for performing FFT operation on an OFDM symbol to obtain an frequency domain OFDM symbol;

a frequency domain channel estimation step for estimating a frequency domain response of the channel by using frequency domain discrete pilots;

an IFFT step for converting the frequency domain channel response to a time domain channel response by an IFFT conversion so as to obtain the time domain impulse response of the channel.

Figure 3A:
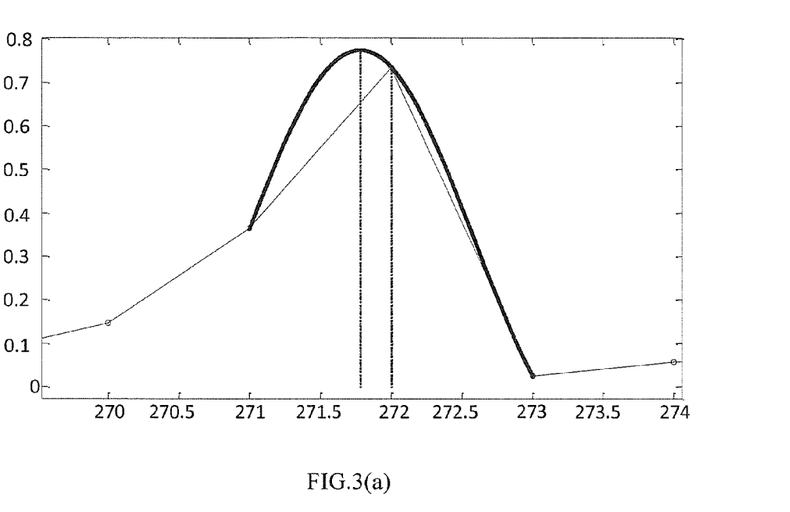
Figure 3B:
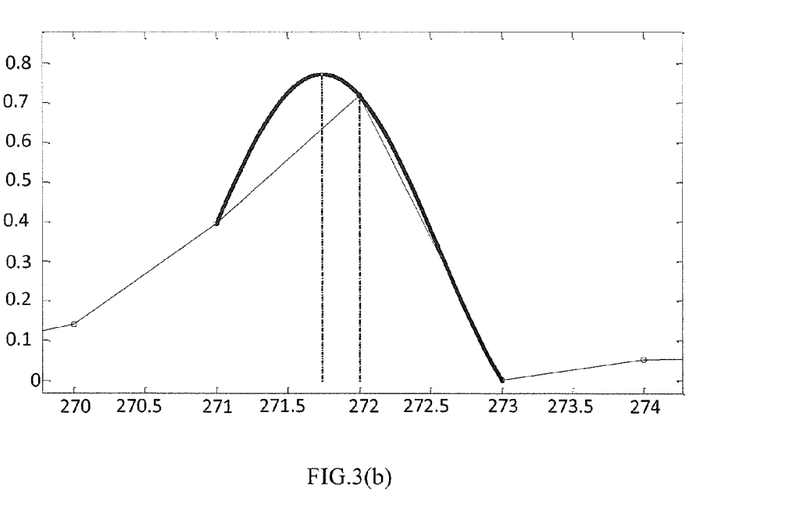

After obtained the time domain channel impulse response through the above method, a high order interpolation using low-pass filter in combination with polynomial interpolation is performed to one of the strong paths. FIG. 3 illustrates the results of the interpolations performed on two consecutive OFDM symbols when sampling frequency offset is set at 1000 Hz, wherein the hollow circles indicate sampling points before the interpolation, while the solid circles indicate sampling points after the interpolation. It can be easily found that a more accurate position of the sampling instant can be obtained after the interpolation. For example, as shown in FIG. 3(a), the current sampling instant is at the 272th point before the interpolation, and the optimal sampling instant is at the 271.78th point after the interpolation, i.e., IntPos=272, and MaxPos=271.78, thus, the sampling phase offset of the current signal frame can be calculated as FracPos=MaxPos−IntPos=−0.22 sample point. The interpolation results of the following OFDM symbol are shown in FIG. 3(b), the optimal sampling instant is at the 271.73th point, in other words, two consecutive optimal sampling instants are $MaxPos_1$=271.78 and $MaxPos_2$=272.73, respectively. Therefore, the sampling frequency offset of the system can be calculated as (272.73−271.78)18704*9.1429 MHz=998 Hz, which is very close to the set value 1000 Hz, proving that the present invention has a good performance in estimation of sampling phase offset and sampling frequency offset.

Figure 4:
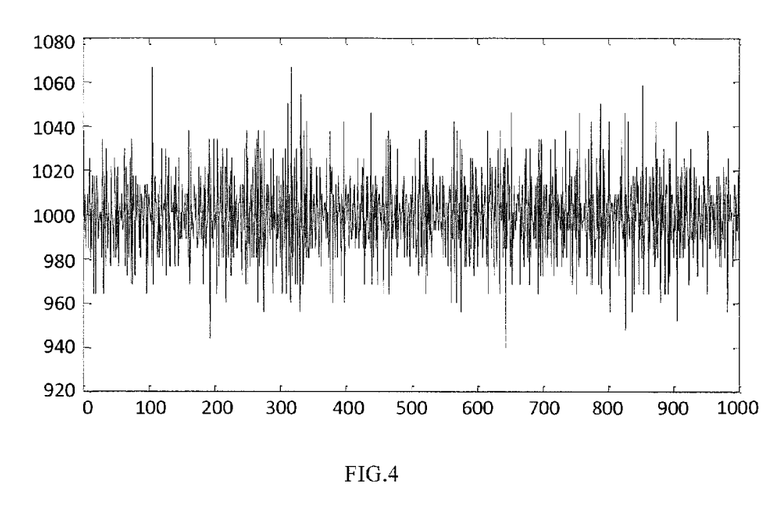
FIG. 4 illustrates the sampling frequency offset directly estimated by the present invention when the DVB-T system has a sampling frequency offset of 1 KHz.
Figure 5:
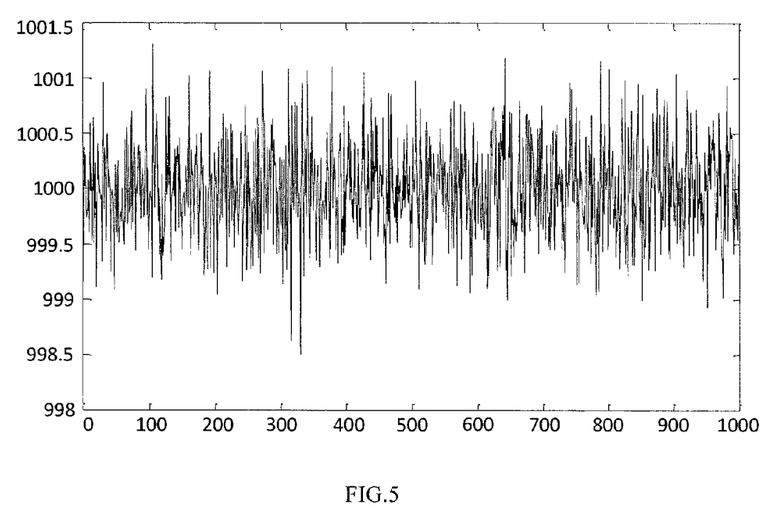
FIG. 5 illustrates the sampling frequency offset estimated by the present invention after smoothing filtering when the DVB-T system has a sampling frequency offset of 1 KHz.

FIG. 4 illustrates the result of a sampling frequency offset estimated directly based on the drifts of paths in channel impulse response of two consecutive OFDM symbols in an environment with a signal-to-noise ratio of 0 dB and a sampling frequency offset of 1000 Hz. The estimation result affected by noises fluctuates around 1000 Hz with a maximum deviation of about 70 Hz. Two methods can be adopted to improve the estimation result: first, we may perform interpolations spaced in time by a plurality of signal frames, as estimation accuracy of a sampling frequency offset is related to the length of the interval time between the two interpolations, and the longer the interval time is, the higher the accuracy will be; second, we may either pass the estimation result through a simple smoothing filter to reduce the influence of noises, as shown in FIG. 5, the maximum deviation is reduced to 1.5 Hz.

Although the European digital terrestrial television broadcasting standard DVB-T (referring to Table 1) is employed as an example to described the application of the present invention in an CP-OFDM system, the present invention can be applied in all CP-OFDM systems, and can be applied in DVB-T2, ISDB-T, WIMAX, WIFI, CMMB, 4G and other wireless transmission systems and power line communications, ADSL and other multicarrier wired communication systems in a similar way. The present invention covers all modifications and simplifications made without departing from the spirit thereof.

TABLE 1

Transmission Parameters of DVB-T System

| System Parameters\ Transmission Mode | 2K-mode | 8K-mode |
|---|---|---|
| Channel Bandwidth | 8 MHz | 8 MHz |
| Sampling Frequency | 9.1429 MHz | 9.1429 MHz |
| Total Number of Subcarriers | 2048 | 8192 |
| Number of Valid Subcarriers | 1705 | 6817 |
| Subcarrier Spacing | 4.4643 KHz | 1.1161 KHz |
| Effective Bandwidth | 7.6116 MHz | 7.6083 MHz |

Embodiment 3

Both the single-carrier and multi-carrier transmission modes employed in China's national Digital Terrestrial Multimedia Broadcast (DTMB) systems adopt a signal frame format using time division multiplexing of frame head PN sequences and frame body data. The PN sequence can be used for carrier recovery, timing recovery and channel estimation, and also serves as a guard interval in the multi-carrier mode. Signal frames are basic units of a frame structure, and each signal frame is made up of two portions, frame head and frame body, respectively. The frame head and the frame body have a same baseband symbol rate of 7.56 Msps. A group of signal frames is referred to as a frame group, and a group of frame groups is referred to as a superframe. The top tier of a frame structure is referred to as a calendar day frame, which is synchronized to absolute time.

Figure 6:
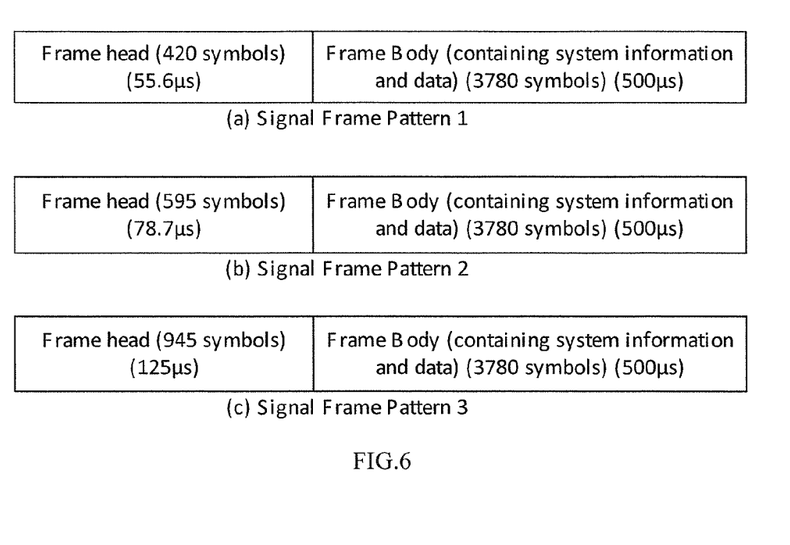
FIG. 6 illustrates three patterns of a signal frame of the DTMB system.
Figure 7:
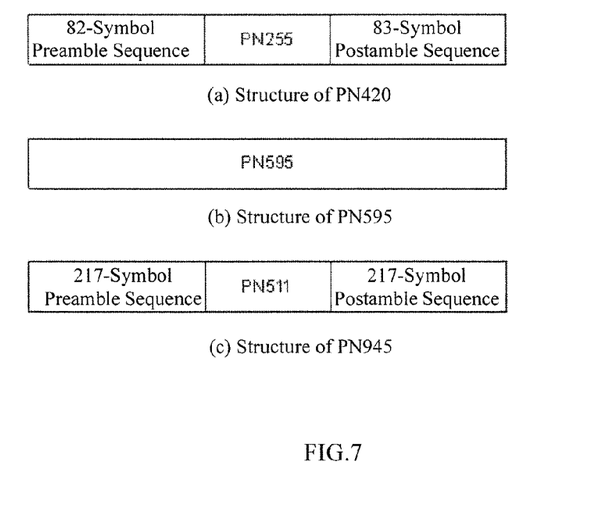
FIG. 7 illustrates three patterns of a PN sequence in the frame head of the DTMB system.

As shown in FIG. 6, the frame head PN sequence has three different patterns to meet the requirement of networks covering different ranges of areas. As shown in FIG. 7, the frame head in pattern 2 is a fixed PN sequence having a length of 595, while the frame head in both patterns 1 and 3 is made up of a preamble sequence, a PN sequence and a postamble sequence. Moreover, the frame head of each signal frame has a fixed phase and a rotated phase. In this embodiment, taking frame head pattern 1 as an example, the frame synchronization sequence has a length of 420 points and the frame body contains 3780 data. Such a complete signal frame has 4200 baseband data points in total.

Figure 8:
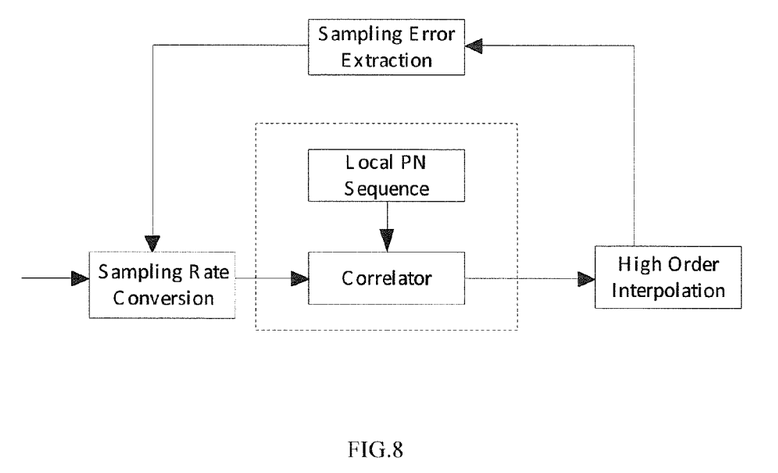
FIG. 8 is a schematic diagram illustrating the structure of a sampling recovery apparatus of the system employing a pseudo random sequence.

The timing recovery of a DTMB receiver is implemented by correlating pseudo random sequence of the frame head with a received sequence. FIG. 8 illustrates a structure of DTMB system including pseudo random sequence employing the present invention. As shown in FIG. 8, the time domain impulse response estimation module (the dashed box) includes: a correlator for correlating a received sequence with a local PN sequence at a double data rate. In other words, the sampling rate conversion module outputs 2-times oversampling signals with a sampling rate Fs=15.12 MHz which is two times of the base band rate Rs==7.56 MHz, and accordingly, the sampling interval will be one half of the symbol interval. Table 2 shows a Brazil-E multipath channel model used in simulation, which is consisted of three paths having the same strength. The interval between the paths is 1 μs.

TABLE 2

| Brazil-E Multipath Channel Model | | | |
| --- | --- | --- | --- |
| Model Parameters | 1st Path | 2nd Path | 3rd Path |
| Delay (us) | 0 | 1 | 2 |
| Power (dB) | 0 | 0 | 0 |

Figure 9:
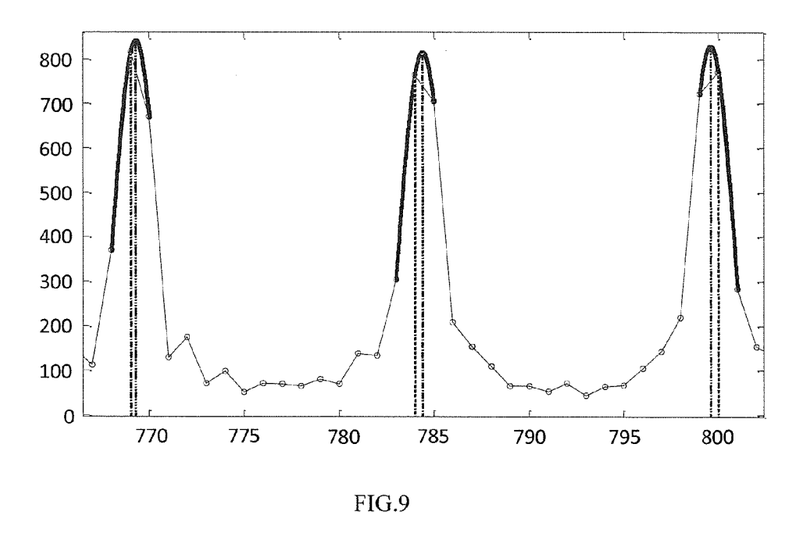
FIG. 9 illustrates interpolation graphs before and after high order interpolation is performed to the DTMB system with a Brazil-E multipath channel.
Figure 10:
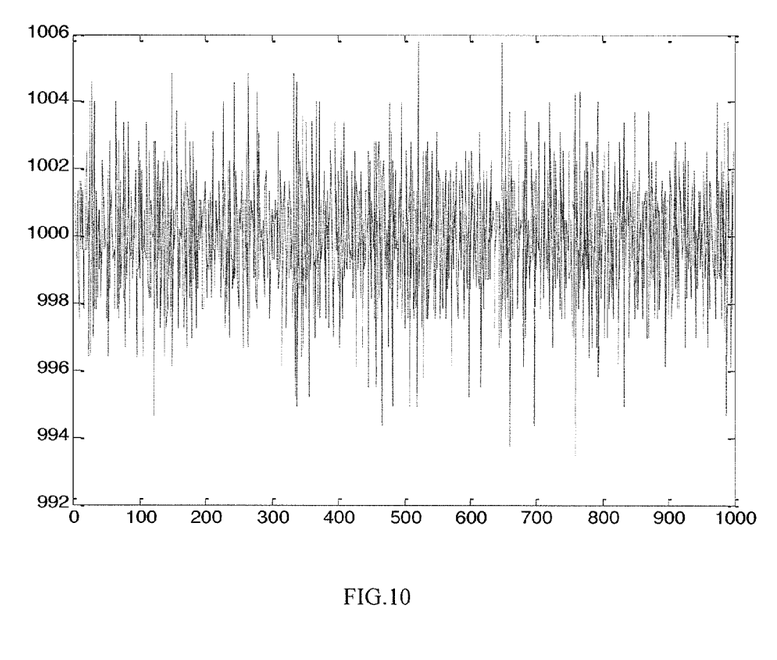
FIG. 10 illustrates a sampling frequency offset graph estimated by the method of the present invention when the DTMB system has a sampling frequency offset of 1 KHz.

A received sequence was first correlated with a local PN sequence, and then high order interpolations were respectively performed to all three paths at the same time. It can be easily found from FIG. 9 that the optimal sampling instant for each path is different from each other, and the sampling frequency offset can be accurately estimated by tracking any one of the paths. In practice, the receiver usually selects only one path for offset estimation and the corresponding adjustment. In this embodiment, high order interpolations were performed to three strong paths in the transmission channel and the paths were continuously tracked. The sampling frequency offset obtained by the estimation of frame synchronization sequences of two consecutive signal frames is shown in FIG. 10. According to results of the simulation, the method of the present invention has advantages of fast capture, high accuracy estimation and low implementation cost. After the estimation of the sampling phase offset and sampling frequency offset, compensation can be performed by adjusting the digitally controlled oscillator in the sampling rate conversion module.

It is obvious from the principle of this embodiment that, for a mobile multipath channel, a plurality of multipath components may be tracked at the same time, such that even when one of the multipath components undergoes fading or even elimination, accurate timing offset information can still be extracted from rest multipath components. With full utilization of multipath components in a transmission channel, this method is capable of performing accurate sampling recovery with a minor cost even in a time variant mobile environment.

Although China's national Digital Terrestrial Multimedia Broadcast (DTMB) system is employed as an example in this embodiment to describe the application of the present invention in a pseudo random sequence spread spectrum system, the present invention can be used in all spread spectrum communication systems employing a pseudo random sequence, and can be used in ATSC, CDMA and other similar communication systems in a similar way. The present invention covers all modifications and simplifications made without departing from the spirit thereof.

The above embodiments are provided for the purpose of describing the invention and are not intended to limit the scope of the invention in any way. It will be apparent to those skilled in the art that various modifications and variations can be made without departing from the spirit or scope of the invention. Thus, it is intended that the present invention cover the modifications and variations of this invention.

What is claimed is:

1. An apparatus for achieving high precision sampling recovery at a relatively low sampling rate, comprising:

a sampling rate conversion module for converting a sampling rate of a received signal to a required sampling rate;

a time domain impulse response estimation module for estimating a time domain impulse response of a transmission channel based on data output by the sampling rate conversion module;

a high order interpolation module for performing high order interpolation to one or more selected transmission paths after obtaining the time domain impulse response; and a sampling error information extraction module for extracting sampling phase offset information and sampling frequency offset information based on interpolation results and drifts in two consecutive interpolation results of the high order interpolation module, wherein the sampling rate conversion module converts the sampling rate of the received signal to the required sampling rate by performing compensation to sampling phases and sampling frequencies based on the extracted sampling phase offset information and sampling frequency offset information.

2. The apparatus according to claim 1, wherein the sampling rate conversion module comprises a digitally controlled oscillator for compensating sampling phases and sampling frequencies so as to obtain the required sampling rate.

3. The apparatus according to claim 1, wherein the time domain impulse response estimation module comprises:

a CP removing module;

an FFT module for performing FFT operation on an OFDM symbol to obtain a frequency domain OFDM symbol;

a frequency domain channel estimation module for estimating a frequency domain response of the channel by using frequency domain discrete pilots; and an IFFT module for converting the frequency domain channel response to a time domain channel response by an IFFT conversion so as to obtain the time domain impulse response of the channel.

4. The apparatus according to claim 1, further comprising a smoothing filter for performing smoothing filtering on the sampling frequency offset information to reduce influence of noises.

5. The apparatus according to claim 1, wherein the time domain impulse response estimation module comprises a correlator for correlating a received sequence with a local PN sequence.

6. A method for achieving high precision sampling recovery at a relatively low sampling rate, comprising:
a sampling rate conversion step for converting a sampling rate of a received signal to a required sampling rate;
a time domain impulse response estimation step for estimating a time domain impulse response of a transmission channel based on data output by the sampling rate conversion step;
a high order interpolation step for performing high order interpolation to one or more selected transmission paths after obtaining the time domain impulse response;
a sampling error information extraction step for extracting sampling phase offset information and sampling frequency offset information based on interpolation results and drifts in two adjacent interpolation results of the high order interpolation step; and
a compensation step for performing compensation to sampling phases and sampling frequencies based on the extracted sampling phase offset information and sampling frequency offset information so as to convert the sampling rate of the received signal to the required sampling rate.

7. The method according to claim 6, wherein the time domain impulse response estimation step comprises:
a CP removing step;
an FFT step for performing FFT operation on an OFDM symbol to obtain a frequency domain OFDM symbol;
a frequency domain channel estimation step for estimating a frequency domain response of the channel by using frequency domain discrete pilots;
an IFFT step for converting the frequency domain channel response to a time domain channel response by an IFFT conversion so as to obtain the time domain impulse response of the channel.

8. The method according to claim 6, wherein, in the high order interpolation step, the transmission paths are selected by simultaneously tracking a plurality of strong multipath components.

9. The method according to claim 6, wherein the sampling phase offset information is extracted using the formula MaxPos−IntPos=FracPos(−1<FracPos<1), where, IntPos is a position of a strong path before the interpolation is performed, indicating a current sampling instant at a low resolution; MaxPos is a position of the strong path after the interpolation is performed, indicating an optimal sampling instant obtained through improving the resolution by the high order interpolation; FracPos is a difference between MaxPos and IntPos, indicating the sampling phase error of a current frame.

10. The method according to claim 6, wherein the sampling frequency offset information is calculated using the formula $R_s$*(MaxPos$_2$−MaxPos$_1$)/FemLen (Hz), where, MaxPos$_1$ and MaxPos$_2$ are optimal sampling instants of a same strong path derived by two consecutive high order interpolations, the two consecutive high order interpolations being spaced in time by a plurality of signal frames; a difference between MaxPos$_2$ and MaxPos$_1$ is a number of offset sampling points resulted from the sampling frequency offset; $R_s$ is a baseband rate; FrmLen is a number of sampling points of the plurality of signal frames between the two consecutive high order interpolations when there is no sampling offset.

11. The method according to claim 6, wherein, in the high order interpolation step, the high order interpolation is only performed to selected transmission paths and several points around each transmission path, the transmission paths being one or more strong paths in a transmission environment.

12. The method according to claim 10, wherein, after calculation of the sampling frequency offset information, the calculated results are passed through a smoothing filter so as to reduce influence of noises.

13. The method according to claim 6, wherein a new signal output is obtained based on a new sampling rate using the formula $y(kT_i)=y[(m_k+u_k)T_s]=\Sigma_{i=I_1}^{I_2}\times[(m_k-i)T_s]h_I[(i+u_k)T_s]$, where, $m_k$ is a reference point of an interpolation filter; $u_k$ is a distance between an actual interpolation point and the reference point; $I_2-I_1+1$ is a number of sample points required by each interpolation.

14. The method according to claim 6, wherein, for a pseudo random sequence spread spectrum system, a pseudo random sequence can be used to correlate with a received sequence in the time domain during the time domain impulse response estimation step.

* * * * *

UNITED STATES PATENT AND TRADEMARK OFFICE
CERTIFICATE OF CORRECTION

PATENT NO. : 8,582,676 B1  
APPLICATION NO. : 13/595775  
DATED : November 12, 2013  
INVENTOR(S) : Yun Zhang Page 1 of 1

It is certified that error appears in the above-identified patent and that said Letters Patent is hereby corrected as shown below:

On the Title Page, please insert Item [30]
--Foreign Application Priority Data
Aug. 30, 2011 (CN) 201110253484.1--.

In the Claims

Column 14, Claim 10, line 14, within the formula, please delete "Fem" and insert --Frm--.

Column 14, Claim 13, line 35, please delete "anew" and insert --a new--.

Signed and Sealed this
Twenty-ninth Day of July, 2014

Michelle K. Lee
*Deputy Director of the United States Patent and Trademark Office*